United States Patent [19]

Gardner

[11] 3,811,109

[45] May 14, 1974

[54] VIDEO SIGNAL SAMPLING DEVICE FOR USE IN IMAGE ANALYSIS SYSTEMS

[75] Inventor: Gerald Marvin Gardner, Saffron Walden, England

[73] Assignee: Image Analysing Computers Limited, Melbourn, Roston, Hertfordshire, England

[22] Filed: Oct. 30, 1970

[21] Appl. No.: 85,383

[30] Foreign Application Priority Data

Oct. 31, 1969 Great Britain .................... 53404/69

[52] U.S. Cl. .................... 340/146.3 AC, 235/92 PC

[51] Int. Cl. .................... G06k 9/12

[58] Field of Search... 178/DIG. 36, DIG. 3, DIG. 1; 340/146.3 AC, 146.3 AE, 146.3 R

[56] References Cited

UNITED STATES PATENTS

| | | | |
|---|---|---|---|
| 2,803,406 | 8/1957 | Nuttal | 178/DIG. 36 |
| 3,244,810 | 4/1966 | Williams | 178/DIG. 1 |
| 3,294,896 | 12/1966 | Young, Jr. | 178/DIG. 3 |
| 3,470,325 | 9/1969 | Frohbach | 178/DIG. 3 |
| 3,619,494 | 11/1971 | Fisher | 178/DIG. 36 |
| 3,632,865 | 1/1972 | Haskell | 178/DIG. 3 |

*Primary Examiner*—Robert L. Griffin
*Assistant Examiner*—George G. Stellar
*Attorney, Agent, or Firm*—Brown, Beveridge, DeGrandi & Kline

[57] ABSTRACT

The invention provides a device for standardising randomly produced electrical signals on a time basis into pulses of duration equal to a whole-number multiple of known time intervals. This is achieved by sampling the original signal at the beginning of each interval of time and generating a two level signal whose instantaneous value is dependent on the result of the sampling carried out at the beginning of the interval. This device is of particular use in image analysis systems employing multiple signal paths since it simplifies the process of synchronising the various circuit elements in the different signal paths and prevents races occurring and largely eliminates problems from rise time variation and transients.

The invention also envisages the use of a particular form of signal storage device in image analysis systems which employ signal standardisation as proposed by the invention. Such signal storage devices are shift registers which derive their shifting signal from the same source as that which generates the sampling control signals. A number of different applications employing shift registers as signal storage devices are described and where applicable the signal sampling technique and standardising process as disclosed by the invention is described with reference to these arrangements.

9 Claims, 2 Drawing Figures

Figure 1:
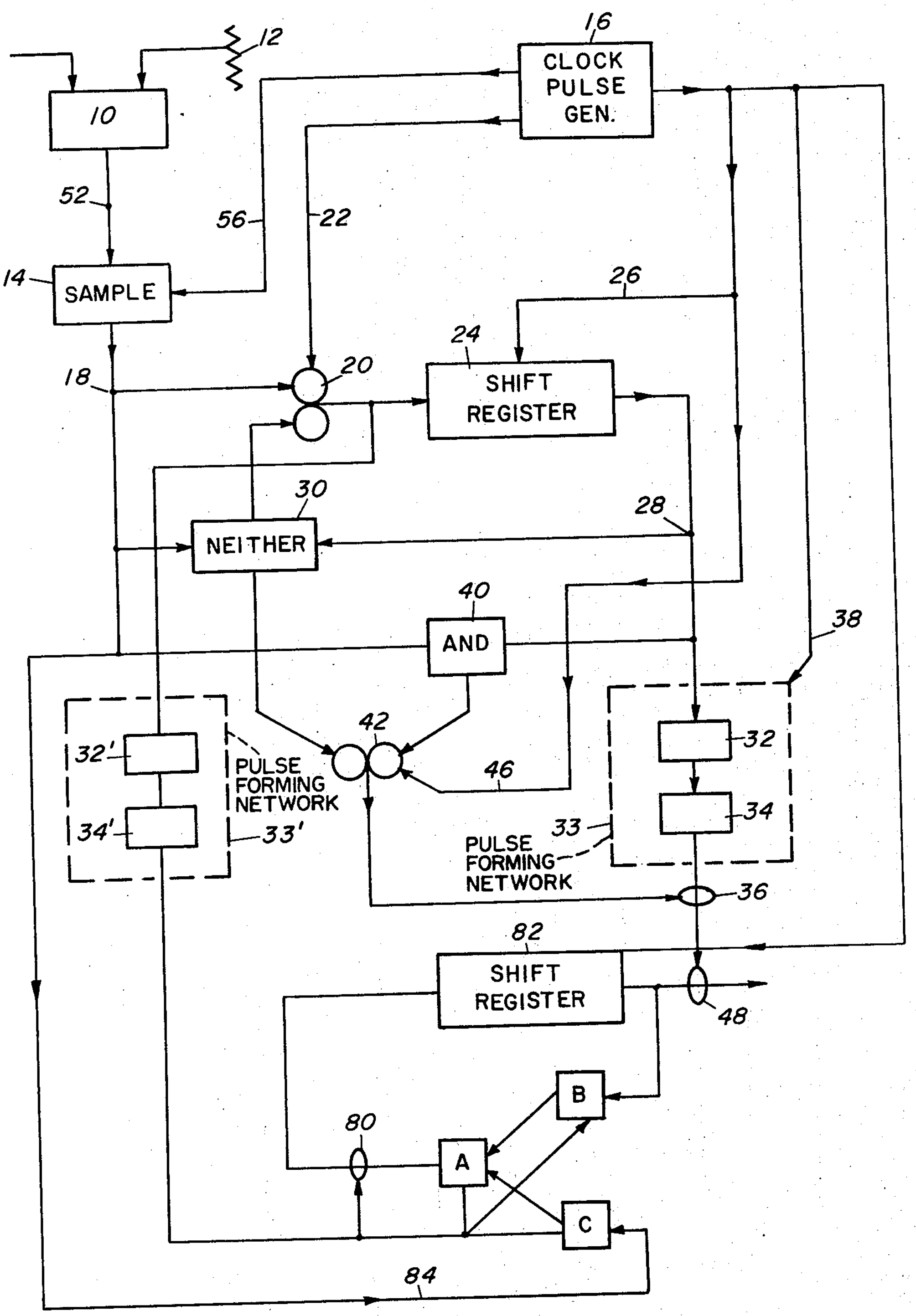

INVENTOR
GERALD MARVIN GARDNER
BY Beveridge and DeGrandi
ATTORNEYS

VIDEO SIGNAL SAMPLING DEVICE FOR USE IN IMAGE ANALYSIS SYSTEMS

This invention concerns image analysis systems and in particular the synchronisation of the signal processing stages which go to make up such a system.

It will be appreciated that where two or more signals are processed in parallel for subsequent computation or operation one on another, it is essential that the signals remain at all times in correct phase relationship. Furthermore where the leading and trailing edges of signals at video signal frequencies are detected, which is typical of image analysis techniques, it is essential that all circuits operated by or acting on such leading or trailing edges operate in exact synchronism.

Delay lines may be inserted throughout the signal paths to ensure that the rise time of each signal path is identical. However this form of compensation is frequency dependent and is consequently difficult to set up and expensive.

According to the broadest aspect of the present invention in an image analysis system comprising a source of scanned video signal corresponding to a field under analysis and signal detection means to generate a detected video signal whose value is always one or the other of two distinct values corresponding to the fulfilment or otherwise of a detection criterion imposed on the video signal, there is provided means generating a recurrent electrical signal of known frequency, means sampling the detected video signal at intervals of time determined by the recurrent signal and means, responsive to the sampled values of said detected video signal to generate a second two value signal whose value at any time corresponds to the last sampled value of the detected video signal.

This has the effect of adding a short time delay to the leading and trailing edges of video signals which may introduce small errors into the system. However the maximum error will correspond to one time interval between sampling points and the frequency of the recurrent signal, typically and hereinafter referred to as clock pulse, is accordingly made sufficiently high to allow for a time interval inaccuracy of this order to be tolerated.

According to another aspect of the invention, in an image analysis system all active circuit elements which are required to follow the changes in the two-value detected video signal are synchronised by "clock pulses" from a single pulse generator, and the output signal therefrom quantized in a similar manner as the detected video signal. In practice the advantage to be gained by synchronising the circuit operations in this way far outweighs any slight loss of resolution or inaccuracy of measurement in the resulting system.

According to a further aspect of the present invention in an image analysis system employing a clock-pulse generator and synchronised circuit elements, two-state information signals (e.g., detected video signals) are stored in and delayed by shift registers. To this end the clock pulses serve as shifting pulses for the shift registers.

One advantage of using a shift register in place of a conventional delay line, lies in the ease and accuracy with which a shift register may be controlled and synchronised with other shift registers and with other circuit elements from a clock-pulse generator. It will be appreciated that very accurate correction circuits would be required in order to obtain the same accuracy if conventional delay line techniques are employed.

Another advantage lies in the inherent stability of a shift register, which is a digital device as compared with a delay line.

A further advantage lies in the ease with which the signal delay period can be altered when shift registers are employed. This can for example be achieved simply by speeding up or slowing down the frequency of the clock pulses.

Variable delay effects can be produced by delaying the clock pulses supplied to the shift register from the clock-pulse generator.

Further advantages of the invention may be realised when it is applied to an image analysis system employing line scanning techniques which is designed to count the features in a field of view. In such a system it is necessary to employ a device to avoid counting each intersection of a feature by the line scan. A coincidence detector is employed for this purpose and systems for achieving this are described in our copending U.S. Pat. Application No. 820,180, filed Apr. 29, 1969, now U.S. Pat. No. 3,619,494 which is hereby incorporated herein by reference. In such a system the intersection information from each line in turn is stored and compared with intersection information contained in the next following line. The detection criterion which is imposed provides for detection (and therefore feature count) when, for each detected feature, there is no intersect information in the current line which is coincident with intersect information for that detected feature, in the preceding line. The point at which it first becomes clear that there is no coincidence of intersect information for that feature between two lines, is referred to as the anticoincidence point for that feature and it is this point which is detected by a coincidence detector as described in our co-pending application No. 820,180, now U.S. Pat. No. 3,619,494.

Since only detected video signal is applied to the coincidence detector the latter is essentially only required to handle a two-state signal as distinct from the complex wave form of a typical video signal. According therefore to a still further aspect of the present invention the signal delay device required for a coincidence detector, for storing information from line to line may thus comprise a shift register, synchronised by clock pulses, as previously described.

Our co-pending application No. 820,180, now U.S. Pat. No. 3,619,494 also describes image analysis systems for producing one or more parameters associated with each feature in an image under analysis. Such parameters may relate to the geometrical or densitometric characteristics of the features and may for example be derived from information contained in or computed from the chords formed by the intersection of the line scans with the feature.

If there are a number of features in the field of view, then in general each scan line will intersect more than one feature and scan intersects of any particular feature will not follow one another in the video wave form. The scan intersects in fact constitute chords from each feature and the chords from various features will therefore follow one another in a complex intermingled sequence. In order to attribute the various chords to their particular features and thus build up a description of each individual feature separately, it is necessary to employ an associated parameter computer with information storage facilities in conjunction with a coincidence detector, the devices forming together an associated parameter system. An increment of information relating to the associated parameter desired for each feature, may be forthcoming from or during each scan intersection with the feature and each such increment of information is made available within the associated parameter computer at a convenient instant during each such line scan intersection of the feature. In this way the value of the associated parameter stored in the associated parameter computer is modified and updated during or at the end of each scan intersection so that at any instant it represents the contribution of all increments of information so far received which relate to the parameter for that feature. The coincidence detector determines (as described before) when the last intersect of the feature by a scan line has occurred and controls the release of the stored information relating to the parameter. This information is released, typically, at the unique instant referred to previously as the anticoincidence point for that feature.

Where as is usual the associated parameter is computed from two-state signals, according to a yet further aspect of the invention any delay device employed as signal storage means in an associated parameter computer may also comprise a shift register synchronised by clock pulses as previously described.

This arrangement is of particular advantage where more than one associated parameter computer is employed for the computation of two or more associated parameters for each feature. It will be appreciated that synchronism is very important where a number of associated parameter computers are operated in parallel, and the result from each computer must be released at the same instant in time (e.g., the anticoincidence point for each detected feature. This becomes even more important when the results from two or more of the computers are required for simultaneous computation in further computer means, to provide a secondary associated parameter for the feature. Such systems are described in more detail in our co-pending U.S. Pat. Application No. 85,384 filed Oct. 30, 1970, now U.S. Pat. No. 3,624,604 which is hereby incorporated herein by reference.

Figure 2:
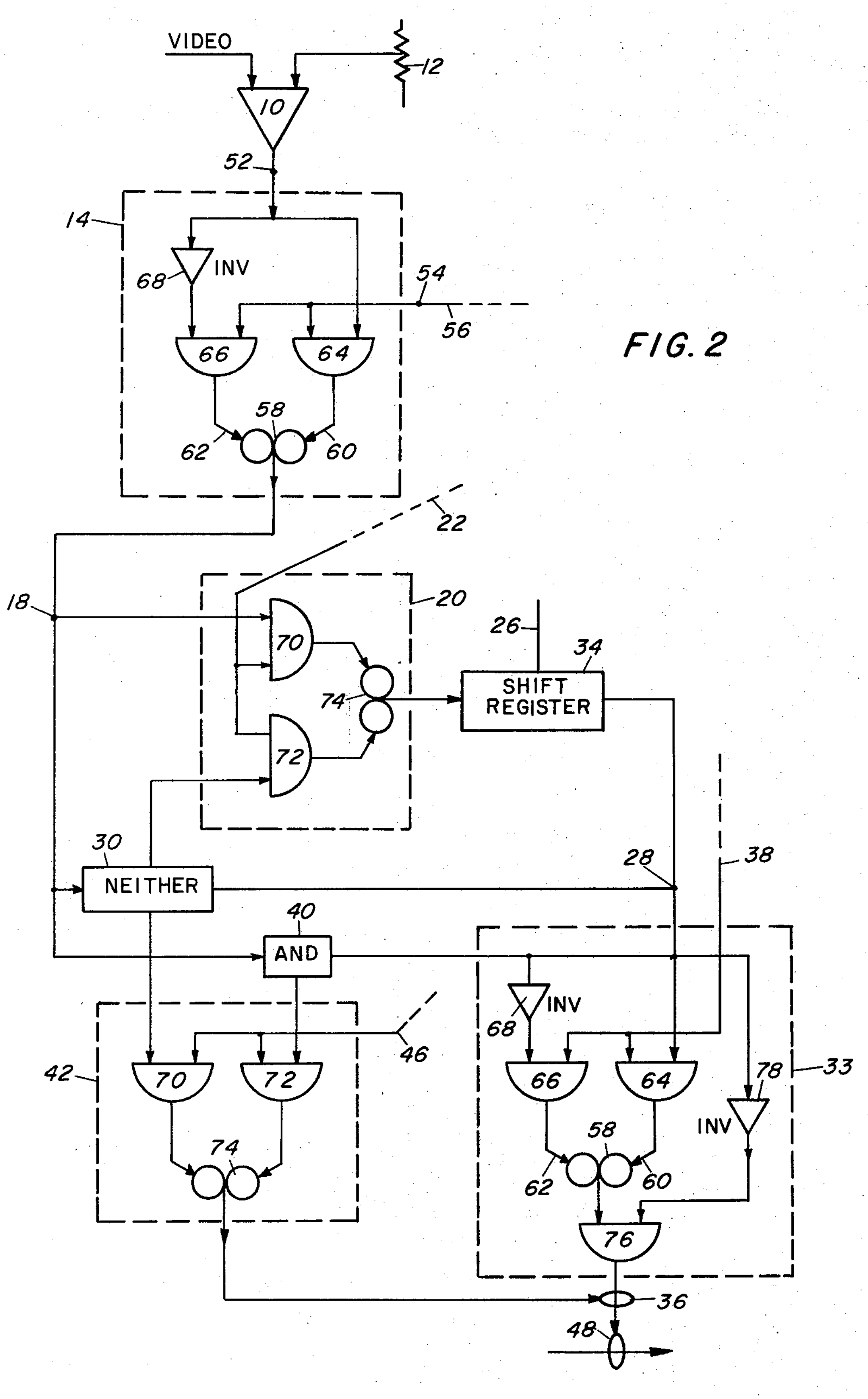

The invention will now be described by way of example with reference to the accompanying drawings, in which:

FIG. 1 is a block circuit diagram of a detector, coincidence and anticoincidence detector and an associated parameter computer for an image analysis system employing shift registers as signal storage and delay devices and synchronised by clock pulses, and FIG. 2 is a detailed circuit diagram of part of FIG. 1 and illustrates how synchronisation of various circuit elements can be achieved.

As employed in this specification the term "shift register" means a binary device having a binary signal input and a binary signal output and a "shift-one" pulse input. The device comprises a large number of serially connected binaries each capable of storing a 1- or 0- signal condition. Initially all the binaries register a 0- condition and on the application of a 1- signal to the input of the shift register, the first binary changes state to a 1- condition. On receipt of a trigger pulse at the "shift-one" input, the 1- condition of the first binary is transferred to the second binary, and the first binary will revert to its 0- condition unless the input to the binary input of the shift register is maintained at the 1- condition, in which event the first binary does not reset but will remain in its 1- condition.

On receipt of each successive trigger pulse, the condition of each binary is transferred to the next one in the line, so that the information applied to the binary input of the device is stored in binary form in the binaries and is shifted in steps from binary to binary, along the length of the device.

It will be seen that such a device provides a convenient signal storage and/or delay device for a binary signal which can be presented in serial form, the number of "bits" which can be accommodated and the delay produced, corresponding to the multiple of the number of binaries in the chain and the frequency of the trigger pulses.

One great advantage which a shift register has over a conventional delay line is the facility to alter the delay produced by the device by simply altering the frequency of the trigger pulses. Furthermore since the device will remain in any one condition for an indefinite period of time until a further trigger pulse is received, it is inherently stable and lends itself to synchronism with other delay devices and associated equipment, which are required to process binary signals for parallel computation.

Referring now to FIG. 1 of the accompanying drawing, part of an image analysis system employing clock pulse control is illustrated. Video signal from a source of video signal such as a television camera or flying spot scanner is applied to an input of a comparater 10 whose other input is supplied with a reference potential from a reference threshold potentiometer 12, the setting of which determines the reference device at any time. The voltage applied to the potentiometer 12 is usually constant, for example from a regulated supply but alternatively may vary in dependence on variations in the DC level of the video signals to provide a compensation for such comparater The output from the comparator comprises a two-state signal depending on whether the video signal at any instant is less than the reference threshold set on the potentiometer 12 or equal to or greater than this value. The output from the comparator is applied to a sampling defice 14, typically a gate, which is controlled by clock pulses from a clock pulse generator 16. The sampling device 14 provides a two-state output signal whose state at any instant is determined by the state of the output signal from the comparator 10 last sampled by the sampling device 14.

It will be seen that the sampling device 14 thus provides guard regions within which signal changes and transients can occur. Thus changes in the two-state signal from the sampling device 14 only occur at set instants in time determined by the sampling points, which are in turn determined by the clock pulses. It will be appreciated that if subsequent equipment also receives clock pulses and only becomes operable to change its state or affect other equipment, also at such points in time, every stage of the equipment will operate at the same instant in time and path length delays and transient signals can largely be ignored.

The two-state output signal from the sampling device 14 is applied to junction 18 and one state of the two-state signal is arranged to provide a set signal from a bi-stable 20. The bi-stable is also gated by clock pulses and to this end a signal path 22 is shown between the bi-stable 20 and the generator 16. The two-state output from the bi-stable 20 is applied to the binary input of a shift register 24 whose "shift-one" input is supplied with clock pulses along signal path 26.

Where rectilinear scanning is employed the number of binaries required for the shift register can be calculated by dividing the frequency of the clock pulses by the number of complete line scans in one frame scan of the scanning equipment. In this way the information appearing at the output of the shift register 24 and supplied to junction 28 will be delayed by exactly one line scan interval. The output from the bi-stable 20 is termed current video and the output from the shift register at junction 28 is termed delayed video.

The detected video signal appearing at the junction 18 is also applied to one side of a "NEITHER" gate 30 the other side of which is supplied with delayed video from junction 28. The arrangement is such that when a 0- condition obtains at junctions 18 and 28, a signal is passed from the "NEITHER" gate 16 to reset the bi-stable 20. The bi-stable 20 is thus set by the leading edge of a detected video signal and is reset immediately after the trailing edge of the delayed video signal from junction 28 (providing that no video signal has subsequently appeared at junction 18).

By virtue of the control of the bi-stable device 20 from the clock pulse generator 16, the bi-stable 20 can only change state at a sampling instant determined by a clock pulse. In this way the so-called modified video signal generated by combining current video with delayed video is always equal to a whole-number-multiple of time intervals between clock pulses.

The differentiating circuit 32 and a rectifying circuit 34 are arranged to produce a pulse corresponding to the trailing edge of each video signal or modified video signal, whichever lasts the longer. As indicated by the signal path 38, the generation of this pulse is preferably clock pulse controlled and since only one pulse is required for each feature, the output from the rectifying circuit 34 is applied to a gate 36 and also from an anticoincidence detector circuit. This latter comprises an AND gate 40 having two inputs, one supplied with detected video signal from junction 18 and the other with delayed video signal from junction 28. When detected video signal and delayed video signal are both present, the AND gate provides a set pulse for a bi-stable device 42. A reset pulse for the bi-stable 42 is derived from the NEITHER gate 30, previously described. For synchronism, the bi-stable 42 is also supplied with clock pulses along a line 46. In this way, irrespective of when a set or reset pulse is received by the bi-stable 42, it will only change state at a sampling point. The output from the bi-stable during a set condition is arranged to close the gate 36 thereby preventing any detected trailing edges of modified video signal from passing therethrough. However in the reset condition, the output of the bi-stable 42 is arranged to open the gate 36. It will be seen that the bi-stable 42 will reset when both current video and modified video signals are absent at 18 and 28 respectively, and this condition is termed anticoincidence. The point in the scan raster defined by the onset of anticoincidence for any particular feature, is referred to as the anticoincidence point for that feature and at this point the gate 36 is opened to allow through the pulse corresponding to the trailing edge of the modified video signal. This pulse can be used to identify the anticoincidence point for each feature in the scan raster, both in position and in time.

This pulse is used to release information accumulated in a shift register 82 and which relates to that particular feature. Such information is commonly referred to as an "associated parameter" of the feature and may for example correspond to information relating to its size, area or density. The pulse from the gate 36 is arranged to open a further gate, shown at 48 in FIG. 1 to release such associated information.

The lower part of the circuit diagram of FIG. 1 illustrates one associated parameter computer, in which the parameter is derived from the detected video signal or any other synchronous signal, keeping the value in association with the particular feature concerned. The associated parameter computer includes a first logic unit C to which the detected video signal is supplied along line 84. This logic unit C produces the particular parameter of interest from information derived from or during each line scan in synchronism with the current video signal, for example its presence, length, position in the scan or the value of some other related signal etc. A second logic module B receives and holds the output signal from a shift register 82 which serves to hold the value of the parameter computed up to and including the previous scan line. The shift register 82 is controlled by clock pulses, but this is not shown in the drawing. A third logic module A accepts both these values and computes a fresh value by including the information from the current scan line (if any). This new value is held in the logic module A ready for application to the shift register 82. The signal from the logic module A is applied to a gate 80 which is controlled by the output from a pulse forming circuit 33′, comprising a differentiating circuit 32′ and rectifying circuit 34′. The pulse forming circuit 33′ is similar in all respects to the pulse forming circuit 33 and the same reference numerals have therefore been used, with a suffix. The input to the differentiating circuit 32′ is derived from the modified video signal V′ and the differentiating and rectifying circuits 32′, 34′ are arranged to produce a pulse at the end of each modified video signal V′ but in advance of that produced by the circuit 33 by the time delay of shift register 24. This pulse is arranged to open the gate 80 in time, corresponding to the end of a modified video signal so that the output from the logic module A is applied immediately to the associated parameter store 82.

The output from the pulse forming circuit 33′ is also arranged to reset the logic modules A, B and C. The associated parameter delay in the shift register 82 is obtained at the end of the feature by opening a gate 48.

More than one associated parameter computer may be used in conjunction with a single coincidence system.

Various arrangements of logic units A, B and C are possible. For example, by arranging that logic module C registers the length of the chord in the current line scan and logic block A adds the output from B and C the associated parameter becomes the area of the feature. Similarly the height, the width or the perimeter of a feature may be determined.

If data handling capacity is limited, a useful arrangement can be obtained by arranging that module C only responds when the chord in the direction of line scan in the current line scan, is longer than a predetermined length. Blocks A and B then merely re-circulate this fact and only one "bit" of information is required the associated parameter recording whether or not the feature contains a chord in the line scan direction longer than the predetermined value. In this way features can be size discriminated on the basis of the longest chord in the line scan direction with no risk of re-entrant features being miscounted.

It will be appreciated that the pulse from the gate 36 may be used to open any number of gates 48, to allow a corresponding number of different associated parameters to be released for each feature. Each associated parameter is generated in an associated parameter computer and stored in a signal storage device until required for release at the anti-coincidence point for the feature concerned. In some instances the shift register 24 may be employed as the signal storage device for one or more of the associated parameters, but in general separate signal storage means is provided for the associated parameters.

One embodiment of the sampling device 14 is illustrated in FIG. 2. The device has three terminals, a signal input 52 (which in practice is connected to the output of the differential amplifier 10 of FIG. 1), an output (which in practice is connected to junction 18 of FIG. 1) and a synchronising signal input 54 (which in practice is connected via signal path 56 of FIG. 1 to the clock pulse generator 16).

The sampling device comprises a bistable 58 whose two switched conditions provide a two-value output signal for terminal 18, corresponding in binary notation to 0- or 1-. The two inputs 60, 62 to the bistable derive input signals from two AND gates 64, 6 respectively, a 1-signal at input 60 serving to set the bistable and a 1-signal at input 62 serving to reset it. Each gate 64, 66 will supply a 1- output signal if both its inputs receive a 1- signal.

Each clock pulse is made equal to a 1- input signal for the gates 64, 66 for the duration of each sampling period. In practice this period may be very short — typically 5–10 nanoseconds.

If a 1- signal is present at junction 52 when a clock pulse is applied to terminal 54, two 1- signals will be applied to gate 64 and the bistable will receive a SET signal at input 60. Conversely, if a 0- signal is present at junction 52 when a clock pulse is applied to terminal 54, the effect of the inverting stage 68 will be to apply a second 1- signal to the gate 66, so that a RESET signal is applied at input 62.

The bistable will thus be inhibited from changing its switched condition except when a clock pulse is applied to terminal 54.

Likewise one embodiment of the bistable devices 20, bistable 42 and anticoincidence pulse producing circuit 33 is shown in FIG. 2.

The bistable devices 20 and 42 each comprise two AND gates 70, 72 each having two inputs and one output. One input of each gate 70, 72 is supplied with clock pulses along lines 22 and 46 and in the case of bistable device 20 the other inputs are connected to junction 18 and the output of the NEITHER gate 30 and in the case of bistable device 42, the other inputs are connected to the output of the NEITHER gate 30 and the AND gate 40. The output of each AND gate 70, 72 provides a SET or a RESET pulse for a bistable 74 whose output in the case of bistable device 20 is connected to the input of shift register 24 and in the case of bistable device 42, provides the switching signal to open and close gate 36.

In order to achieve the maximum benefit from a clock-pulse controlled system, the anticoincidence pulse producing circuit 33 is not formed by a differentiating device 32 and rectifying device 34 but instead is designed to incorporate logic modules to detect the trailing edge of a detected video or modified video signal. Part of the circuit comprises a sampling circuit corresponding to 14 and the same reference numerals have been used to denote similar circuit elements. The output from the bistable 58 provides one input for an AND gate 76 the other input being obtained from an inverting stage 78 whose input is supplied from junction 28. In this way an output is obtained from the AND gate 76 at the end of detected video or modified video (whichever is the longer) of duration equal to the time interval between clock pulses.

It will be appreciated that if the bistable device 20 introduces a delay equivalent to the time interval between the clock pulses, this delay can be included in the delay introduced by the shift register, and where a total delay of N clock-pulse intervals is required between junctions 18 and 28, the shift register 24 is only required to introduce a delay of (N−1) intervals.

Although it has not been shown in detail on FIG. 2, the pulse forming circuit 33′ of FIG. 1 may also be formed from logic units. The arrangement illustrated at 33 in FIG. 2 may be utilized in exactly the same manner in place of differentiating and rectifying devices 32′ and 34′. In this event clock pulses must also be supplied to it as for 33 in FIG. 2.

I claim:

1. In an image analysis system comprising a source of scanned video signal corresponding to a field under analysis, means for comparing the video signal amplitude with a reference voltage to generate a first two value signal whose value is always one or the other of two values depending on whether the video signal amplitude is greater or less than the reference voltage, means for generating a recurrent electrical signal of known frequency and electronically operated gate means for sampling the two value signal at a frequency corresponding to the frequency of the recurrent signal, the improvement comprising, a bistable device responsive to the output signals from said electronically operated gate means is set if the sampled value is one of the two values and reset if the sampled value is the other of the two values thereby to generate a second two value signal whose value at any instant corresponds to the last sampled value of the first two value signal, and a shift register for storing said second two value signal from each line scan, said means for generating a recurrent electrical signal being connected to trigger said shift register so that the signals in said register are shifted at said frequency of said recurrent signal.

2. An image analysis system as set forth in claim 1 further including a pulse producing means responsive to said stored signal for producing a pulse indicative of the trailing edge of said feature, said means for generating a recurrent electrical signal being arranged to enable said pulse producing means at said frequency of said recurrent signal.

3. An image analysis system as set forth in claim 2 wherein said frequency of said recurrent signal is adjustable.

4. An image analysis system as set forth is claim 1 further including means responsive to said two state signal and said stored signal for providing a fixed value output signal when neither said two state signal or said stored signal are present and bistable means which is set by the presence of said fixed value signal, said means for generating a recurrent electrical signal being arranged to enable said bistable means to change state at said frequency of said recurrent signal.

5. An image analysis system is set forth in claim 4 wherein said recurrent frequency is adjustable.

6. An image analysis system as set forth in claim 1 wherein said field includes at least a feature to be analyzed and said shift register stores said second two value signal for a period equal to a line scan interval, further comprising means for comparing said stored signal with said second two value signal from the next line scan to produce an output signal and logic means responsive to said output signal for generating a signal indicating that the last intersect of a feature by a scan line has occurred.

7. An image analysis system as set forth in claim 6 in which the frequency of said recurrent signal is adjustable.

8. An image analysis system as set forth in claim 6 further including means for generating information corresponding to an associated parameter for each detected feature in said field, means for storing said information, and means responsive to said signal indicating that the last intersect of a feature in a scan line has occurred for releasing said stored information, said means for generating information for including one or more shift registers each shift register being controlled by said recurrent signal and serving as a signal delay device, whereby an input condition of the shift register is shifted at intervals determined by the frequency of said recurrent signal.

9. An image analysis system as set forth in claim 8 wherein said frequency of said recurrent signal is adjustable.

* * * * *